April 14, 1970  C. S. BEARD ET AL  3,505,814
VALVE OPERATOR SYSTEM
Filed Nov. 1, 1967  3 Sheets-Sheet 1
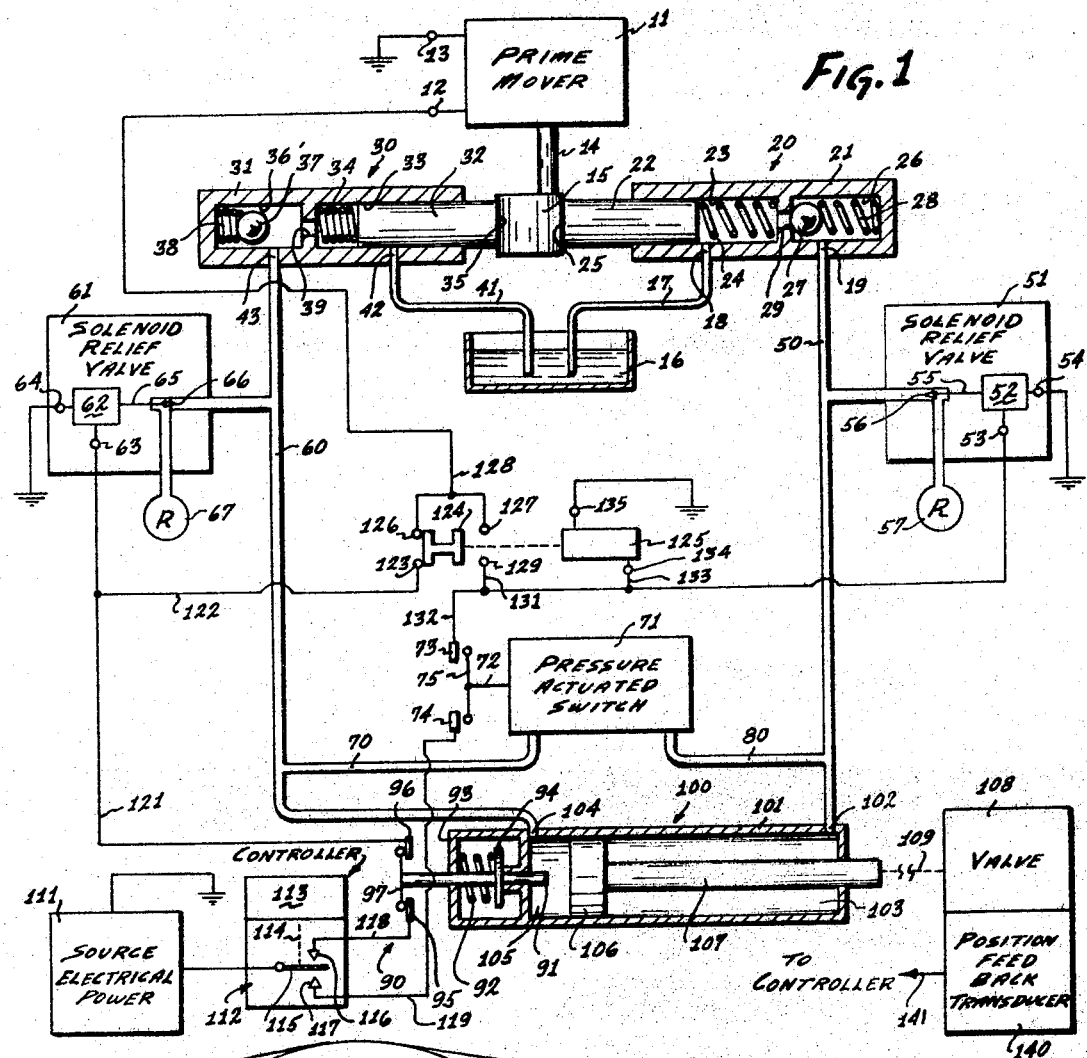
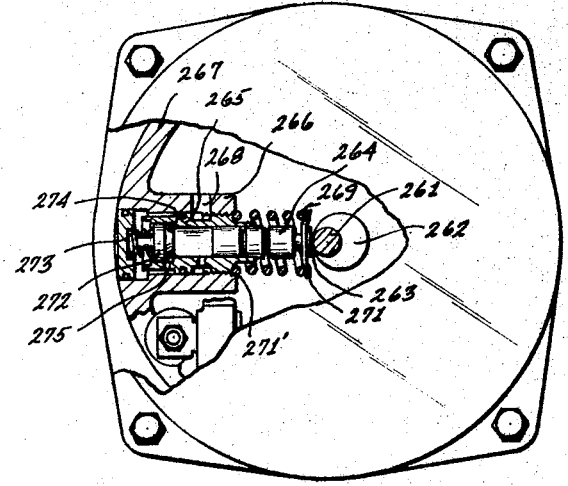
INVENTORS
CHESTER S. BEARD
FRANK R. HEDGER
BY Nilsson + Robbins
ATTORNEYS

INVENTORS
CHESTER S. BEARD
FRANK R. HEDGER

BY Nilsson + Robbins
ATTORNEYS

INVENTORS
CHESTER S. BEARD
FRANK R. HEDGER

United States Patent Office 3,505,814
Patented Apr. 14, 1970

3,505,814
VALVE OPERATOR SYSTEM
Chester S. Beard, Woodland Hills, and Frank R. Hedger, Van Nuys, Calif., assignors to Bell Aerospace Corporation, a corporation of Delaware
Filed Nov. 1, 1967, Ser. No. 679,898
Int. Cl. F15b 15/18, 13/02
U.S. Cl. 60—52     7 Claims

ABSTRACT OF THE DISCLOSURE

Disclosed is a hydraulically powered operator for utilization to position a valve in a desired position responsive to signals applied from a controller. The system includes a prime mover connected to a hydraulic pump which supplies hydraulic fluid to a pair of conduits connected to a hydraulic actuator which in turn is connected to operate the valve. Valves are operatively interconnected with the pair of conduits in such a manner as to apply fluid under pressure to one side of the valve actuator while at the same time relieving the opposite conduit. A pressure-actuated switch is connected to the actuator in such a manner as to automatically maintain force applied to the valve, when it is moving in the closed direction, until the pressure within the actuator reaches a predetermined value. If power is removed from the system either intentionally or inadvertently, the system is hydraulically locked in its last position.

BACKGROUND OF THE INVENTION

In the prior art there has been provided a large variety of valve operators of various types and power supplies therefor. Such operators include linear valve operators to which the present invention is particularly adapted although it may be used with other types of valve operators. In most of the known prior art linear valve operators, the hydraulic actuator mechanism is spring-loaded so that the hydraulic power in operating the valve must also be utilized to overcome the force of the spring. In the event of a loss of power in such systems, the spring automatically returns the hydraulic actuator to a predetermined position.

Furthermore, in most prior art hydraulically operated valve operators the stroke of the actuator is determined by mechanically actuated limit switches positioned at predetermined points on the hydraulic actuator. As a result thereof, the stroke must be adjusted in the closing direction to obtain the desired seal of the valve against its seat. In the event environmental conditions change, the valve stroke must again be readjusted to compensate therefor.

In many prior art valve operators a manual operating apparatus is provided which may be connected to directly operate the valve stem on the valve in the event of failure of the operator for any reason. Such manual apparatus requires the application of relatively large amounts of force to accomplish closure or opening of the valve.

SUMMARY OF THE INVENTION

Accordingly, it is an object of the present invention to provide a valve operator which is hydraulically operated and utilizes the full available power for application to the valve being operated.

It is another object of the present invention to provide a valve operator which upon de-energization thereof, either intentionally or inadvertently, hydraulically locks the entire system in its last position.

It is a further object of the present invention to provide a valve operator which may be field adjusted insofar as the force exertion on the valve seat is concerned when the valve is in its closing position so as to provide a custom valve operator for utilization with seals which are peculiar to each valve to which the operator may be connected.

It is another object of the present invention to provide a hydraulic valve operator of the linear type which is simple, self-contained, easy to maintain and rugged in operation.

It is still another object of the present invention to provide a valve operator which may be manually manipulated to open and close a valve to which it is connected thereby providing the mechanical advantage present in the operator apparatus.

A valve operator in accordance with the present invention includes actuator means adapted for connection to a valve which is connected throgh conduit means to a pump means which is adapted to provide fluid under pressure. The conduit means includes first and second conduits connected betwen the pump and the actuator. Valve menas is associated operatively with the conduits so as to provide fluid under pressure through one of such conduits while simultaneously relieving the other of the conduits.

BRIEF DESCRIPTION OF THE DRAWINGS

Other and more specific objects and advantages of the present invention, both as to its operation and organization, will become apparent from a consideration of the following description taken in conjunction with the accompanying drawings which are presented by way of example only as illustrative of a specific embodiment of the present invention but are not intended as a limitation upon the scope of the claims appended hereto and in which:

FIGURE 1 is a schematic representation of a valve operator constructed in accordance with the present invention;

FIGURE 3 is a partial view shown partly in cross-section of one portion of the valve operator illustrated in FIGURE 2.

DESCRIPTION OF THE PREFERRED EMBODIMENT

Figure 2:
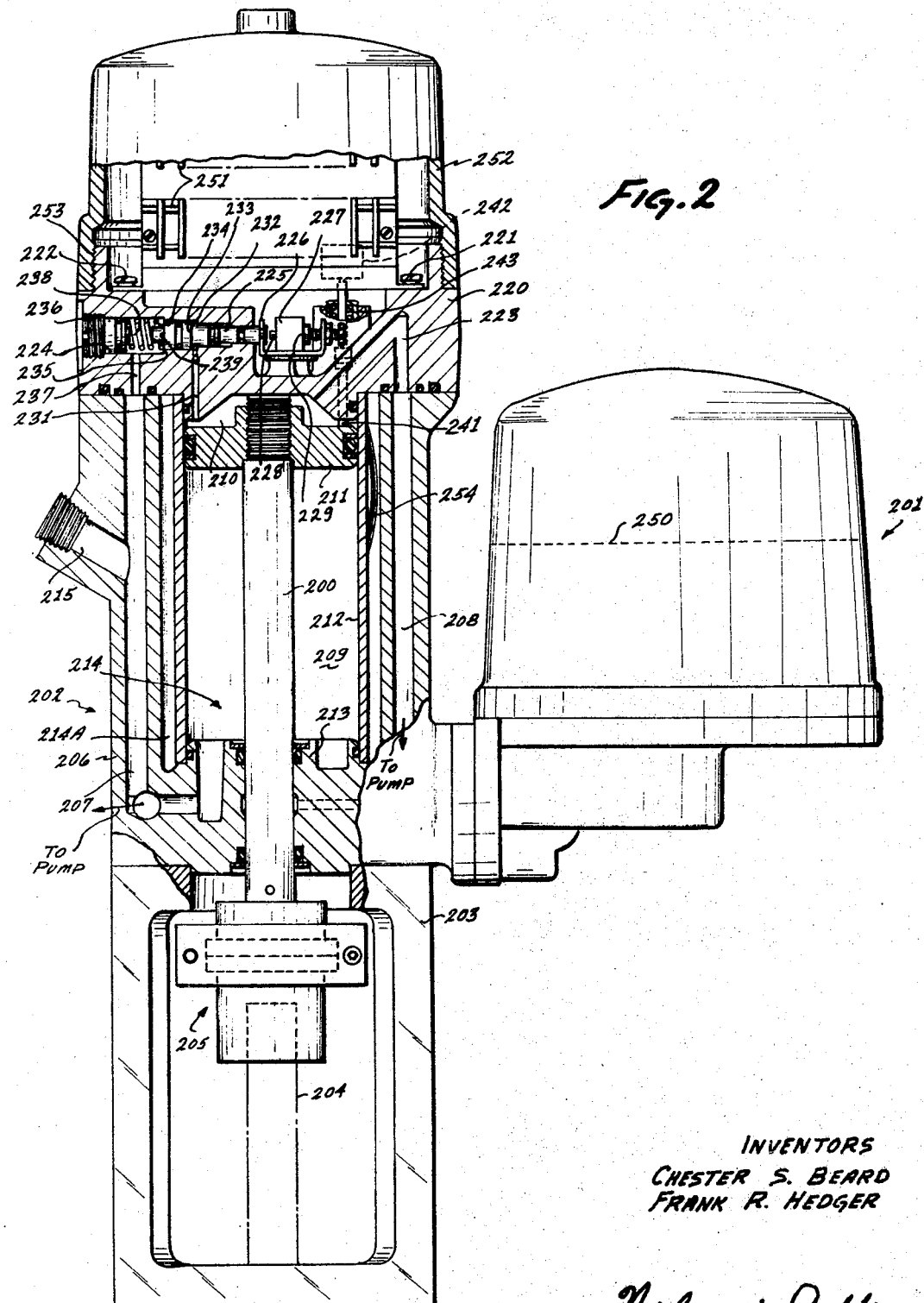
FIGURE 2 is a plan view of a valve operator, illustrated partly in cross-section, constructed in accordance with the principles of the present invention.

Referring now to the drawings and more particularly to FIGURE 1 thereof, there is illustrated schematically a system constructed in accordance with the present invention. As is therein shown, a prime mover 11 is illustrated in block form as an electrical motor having input terminals 12 and 13 to which electrical energy may be connected. It should, of course, be expressly understood that the prime mover although illustrated as an electrical motor, may utilize any source of power desired such as a pneumatic motor. The prime mover rotates a shaft 14 to which there is affixed an eccentric cam means 15 which is driven by the shaft 14. A pair of pumps 20 and 30 are operatively associated with the eccentric cam means 15 in such a manner as to pump fluid under pressure from a source 16 thereof to the system as will be explained more fully hereinafter.

The pump 20 includes a housing 21 within which there is a cam follower means in the form of a piston 22 slidably disposed in a chamber 23. The piston 22 is spring-loaded by a spring means 24 so as to cause its end surface 25 to ride continuously against the surface of the eccentric cam means 15. Positioned within a chamber 26 provided within the housing 21 of the pump 20 is a ball check valve 27 which is spring-loaded by spring means 28 against a valve seat 29. A conduit 17 communicates with the source of fluid 16 and an intake port 18 formed in the housing 21. An exhaust port 19 is also provided in the housing 21 and communicates with a first conduit 50 which is connected to a cylinder 101 of an actuator 100. The various elements of the pump 30 are identical to those of the pump 20 and such is indicated by using the same unit designation in the 30 decade as was used in the 20 decade in describing the pump 20. The pump 30 is connected by a conduit 41 with the source 16 of fluid in such a manner that the conduit 41 is connected to an intake port 42. An exhaust port 43 is connected to a conduit 60 which is also connected to the cylinder 101 of the actuator 100.

It should be noted with respect to the prime mover and the two pumps 20 and 30 that the pump 20 is shown at the end of its intake stroke while the pump 30 is shown at the end of its exhaust stroke. As will be recognized by those skilled in the art, during the exhaust stroke of a piston fluid is expelled past the ball check valve into the conduit connected with the exhaust port of the pump. During the intake stroke, the ball check valve is returned to its seated position and when the intake port is uncovered, fluid fills the chamber preparatory to being exhausted during the immediately following exhaust stroke.

A solenoid relief valve 51 is connected to the conduit 50. As is schematically illustrated, the relief valve 51 includes a solenoid coil 52 having terminals 53 and 54 across which electrical energy may be applied to energize the same. Upon energization, a plunger illustrated schematically at 55 is actuated to remove the plug 56 from its seat, thereby connecting the conduit 50 to return as illustrated at 57.

An identical solenoid relief valve 61 is connected to the conduit 60 and the parts thereof are the same as the solenoid relief valve 51, which is illustrated by using the same numbers in the 60 series as was used in the 50 series.

As is illustrated, the conduit 50 is connected to the cylinder 101 through a port 102 to supply hydraulic fluid into chamber 103 thereof. The conduit 60 is connected through port 104 so as to apply fluid into chamber 105 of the cylinder 101. Positioned within the cylinder 101 is a piston 106 having a piston rod 107 connected thereto and movable therewith. The piston rod 107 in turn is connected to a valve 108 as is illustrated by the dashed line 109 so that upon movement of the piston 106 and its associated piston rod 107, the valve 108 is operated. When the piston 106 is moved toward the right for a distance sufficient to close the valve 108, pressure in chamber 105 increases so long as fluid under pressure is supplied by the pump 30 through the conduit 60. As the pressure increases, it is transmitted by the conduit 60 into the conduit 70 and thereby into a pusher actuated switch 71. The pressure actuated switch is adjusted so that upon reaching a predetermined pressure, it is actuated so as to move the plunger 72 toward the right as viewed in FIGURE 1, thereby breaking the electrical connection formed between the contacts 73 and 74 by the shorting bar 75. The functioning of the apparatus when such electrical circuit is discontinued will be described more fully below.

When fluid under pressure is applied through conduit 50 to the chamber 103 of the cylinder 101, the piston 106 and piston rod 107 are moved toward the left which is the opening direction of the valve 108. As such movement commences, pressure within the conduit 50 is transmitted through the conduit 80 to the pressure actuated switch 71 in such a manner as to reset the switch by causing the shorting bar 75 to move into contact with the contacts 73 and 74, as again will be more fully described hereinbelow. As the piston 106 moves toward the left, it will contact the end of the rod 91 of the limit switch 90 transporting the same toward the left against the force of the spring 92 which is held between the end 93 of the housing for the limit switch 90 and the spring retaining member 94. This movement toward the left breaks the electrical contact between the contacts 95 and 96 formed by the shorting bar 97. The limit switch 90 thereby controls the opening movement of the actuator 100. Thus it is seen that the movement of the actuator in each direction is controlled by the actuation of a limit switch.

Operation of the apparatus as above described is effected through the application in the example illustrated of electrical energy to the prime mover and a selected solenoid relief valve. The electrical energy is supplied from a source 111 thereof to switching means 112 which is controlled by a controller 113 as is illustrated by the dashed line 114. The switching means 112 is illustrated as a three-position center open switch having the movable contact 115 and the stationary contacts 116 and 117. A lead 118 is connected from the stationary contact 116 to the contact 95 while an additional lead 119 is connected from the stationary contact 117 to the contact 74 of the pressure actuated switch 71.

An additional electrical lead 121 is connected from the contact 96 to the terminal 63 of the solenoid coil 62, the other terminal 64 of which is connected to ground as illustrated. The lead 121 is also connected by way of lead 122 to a stationary contact 123 of a relay 125. As is illustrated contacts 126 and 127 of the relay 125 are connected together and a lead 128 is connected therefrom to the terminal 12 of the prime mover 11, the terminal 13 being connected to ground as shown. An additional contact 129 is connected to the contact 73 of the pressure actuated switch 71 through a lead 131 which is connected to the lead 132. The lead 132 is also connected to an additional lead 133 which is connected to the terminal 134 of the relay coil 125, the terminal 135 of the coil being connected to ground as shown. The lead 132 is also connected to the terminal 53 of the solenoid coil 52, the terminal 54 of which is connected to ground as illustrated.

In operation of the device as illustrated schematically in FIGURE 1, if the movable contact 115 of the switch means 112 is placed in contact with the stationary contact 117, electrical energy is applied from the source 111 thereof through the lead 119, the closed contacts 73, 74, 75 of the pressure actuated switch 71 along the lead 132 to the lead 133 so as to energize the relay coil 125. Simultaneously, the electrical energy is also applied to the coil 52 of the solenoid relief valve 51 thereby retracting the plug 56 so as to connect the conduit 50 to the reservoir 57. Upon energization of the relay coil 125 the contacts 127, 129 are connected together by the movable member 124 of the relay 125 thereby to apply electrical energy along the lead 128 to the prime mover 11. Upon energization of the prime mover 11, the pumps 20 and 30 start into operation and supply fluid from the source 16 thereof through the exhaust ports 19 and 43 into the conduits 50 and 60 respectively. Since the solenoid relief valve 51 has been actuated, the conduit 50 is connected to the reservoir and the fluid supplied by the pump 20 is returned immediately to the reservoir through the connection 57 thereof. Since solenoid relief valve 61 has not been actuated, fluid is applied through the conduit 60 into chamber 105 of the cylinder 101. Such action causes the piston 106 and piston rod 107 to move toward the right until the valve 108 is seated against its valve seat. Additional force is continued to be applied until the valve has completely sealed against its seat. When such has occurred, the pressure appearing in the chamber 105 as above indicated is transmitted to the pressure actuated switch 71 by the conduit 70 so as to cause the plunger 72 to move toward the right. When such occurs, the shorting bar 75 opens the circuit between the contacts 73 and 74 thereby de-energizing the solenoid relief valve 51 and the relay 125 to thus remove electrical energy from the prime mover 11. Under these circumstances, it will be noted that both solenoid relief valves 51 and 61 are now closed and the system is hydraulically locked in its closed position. Such would obviously occur if the electrical energy were removed at any point during the stroke of the piston 106 and piston rod 107.

If the movable contact 115 is now moved into contact with the stationary contact 116, electrical energy is applied along the lead 118 through the closed contacts 95, 96 and 97 of the limit switch and along the lead 121 so as to energize the coil 62 of the solenoid relief valve 61 thereby connecting the conduit 60 to the source of fluid or reservoir through the connection 67 therewith. Simultaneously, electrical energy is applied along lead 122 through the closed contacts 123, 124 and 126 of the de-energized relay 125 and along the lead 128 to the prime mover 11. Operation similar to that above described then occurs so as to provide fluid under pressure into the chamber 103 of the cylinder 101. Under these circumstances the piston 106 and piston rod 107 move toward the left as shown until contact is made by the piston 106 with the end of the rod 91 of the limit switch 90 so as to move the shorting bar 97 out of contact with the contacts 95 and 96 thereby removing electrical energy from the prime mover 11 and the solenoid relief valve 61. Thus again the system is locked in place hydraulically by the de-energization thereof.

Simultaneously with the application of fluid under pressure to the conduit 50, such was transmitted through the conduit 80 into the pressure actuated switch 71. The application of pressure from the conduit 50 through the conduit 80 to the pressure actuated switch 71 causes the rod 72 to move toward the left so as to cause the shorting bar 75 to once again complete the electrical circuit between the stationary contacts 73 and 74.

In some applications it is desired to provide valve position information so as to proportionally operate the valve. For such conditions a position feedback transducer 140 is connected to the valve 108 so as to provide an output signal indicative of the position of the valve 108 at all times. This output signal is applied, as indicated by the arrow 141 to the controller 113 to properly position the valve in accordance with information supplied through command and feedback signals as will be understood by those skilled in the art.

A more detailed illustration of the construction of the self-contained hydraulically actuated valve operator constructed in accordance with the present invention may be determined by referring now to FIGURES 2 and 3.

As is shown particularly in FIGURE 2, the valve operator includes a pump section 201 and an actuator section 202. The combination of the pump and actuator sections are fitted together to form a unitary operator which is held upon the body of a valve by a mounting bracket 203. The piston 211 and piston rod 200 are connected to the valve stem 204 (shown in phantom) by a connecting collar mechanism 205 as is well known in the prior art. Thus, as the piston 211 and piston rod 200 reciprocate (upwardly and downwardly as viewed in FIGURE 2) the valve stem 204 is likewise manipulated to open and close the valve.

The actuator section 202 includes a body 206 within which there are formed conduits 207 and 208 which lead to chambers 209 and 210 respectively on each side of the piston 211. The conduits 207 and 208 lead to the exhaust ports of the pumps 20 and 30 (FIGURE 1). The chambers 209 and 210 are defined by a cylinder 212 which is supported upon one end 213 of the body 206 in a cavity 214. A remainder 214A of the cavity 214 is formed about the outer periphery of the cylinder 212 and the wall of the body 206 forming the cavity 214. The remainder of the cavity 214A is utilized as a portion of the reservoir for the fluid. A filler opening 215 is provided through which hydraulic fluid is applied to the system.

A cylinder head 220 is held in place upon the body 206 by bolts or the like as shown at 221 and 222. A conduit 223 is formed within the head 220 to interconnect the conduit 208 with the chamber 210, as is illustrated. A bore 224 is provided within the head 220 for receipt of the pressure actuated switch 71. As is shown, the pressure actuated switch includes a spool 225 which has one terminal end connected to a yoke 226 the arms of which actuate a switch mechanism shown at 227, through the medium of contacting the buttons 228 and 229 extending from the switch 227.

For example, in operation when the piston 211 has moved downwardly to the extent such that the valve to which the actuator is connected has seated and pressure builds up within the chamber 210, such pressure is transmitted through the conduit 231 into the chamber 232 provided in the bore 224. The pressure operates against the face of the land 233 on the spool 225 urging it toward the left as viewed in FIGURE 2. When the force generated by the spring 234 is overcome by the force generated through the pressure acting against the land 233, the spool 225 moves toward the left as viewed in FIGURE 2. Such movement toward the left causes the yoke 226 to engage the button 229 to thereby actuate the switch 227 and stop the pumps 20 and 30 from providing fluid as above described. Immediately upon the supply of fluid to the chamber 210 ceasing, the spring 234 returns the spool 225 to the position shown. It should, however, be noted that the shoulder 235 in the bore 224 stops the movement by the spring 234 of the spool 225. Therefore, the spool 225 will occupy the position shown in FIGURE 2, and the switch 227 will remain open. It should also be noted that by movement of the threaded plug 236, the amount of tension provided by the spring 234 is adjustable so that the amount of pressure required to cause the spool 225 to move toward the left thereby to actuate the switch 227 is adjustable once a particular valve has had the operator attached thereto.

The switch 227 is reset by reversing the movement of the piston 211 within the cylinder 212. Such reversal is accomplished by providing fluid to chamber 209 through the conduit 207. Upon such occurring, the pressure appearing in the conduit 207 is transmitted through the opening 237 into the bore 224 and particularly into the cavity 238. The fluid pressure appearing in the cavity 238 operates against the left surface of the land 239 on the spool 225 thus causing the spool to move toward the right as viewed in FIGURE 2. Movement of the spool toward the right continues until the land 233 engages the shoulder 239 which thus stops movement of the spool 225. This limit of travel of the spool 225 is sufficient to carry the spool 225 into contact with the contact arm 228 of the switch 227 thereby resetting it and making it available for a subsequent closing operation of the actuator as previously described.

As the piston 211 travels upwardly, it engages the rod 241 of a limit switch 242 supported upon the head 220. As is illustrated, the rod 241 is spring loaded downwardly by a spring 243 out of engagement with the switch 242. As the piston moves upwardly, the rod is also pushed upwardly against the force of the spring 243 until the switch 242 is actuated to stop the pumps 20 and 30 as above described.

Electrical terminal strips 251 are mounted upon the head 220 and the assembly is covered by an end cap 252 which is threadably supported upon the head 220 as is shown by the threads 253. Electrical connections are made to the terminal strips 251 in such a manner as to accomplish the desired electrical control. The electrical wires are fed through the head 220 in such a manner as to be positioned within the reservoir as is illustrated schematically at 254. These electrical leads 254 are then brought through and into the pump section 201 of the actuator. The pump section 201 of the actuator contains the principal amount of fluid as well as housing the pump and the prime mover. For example, the fluid contained within the pump section 201 may have a level such as that illustrated by the dashed line 250. The pump mechanism would be positioned below the level of the fluid 250 and the electric motor positioned above the level 250 of the fluid.

Details of one form of pump which is particularly adapted for utilization in the present invention is illustrated in part in FIGURE 3 to which reference is hereby made. As is therein illustrated, a driven shaft 261 has affixed thereto an eccentric cam 262 which engages and rides against one end surface 263 of a piston 264 of the reciprocal pump. A cylinder 265 within which the piston 264 reciprocates is threadably attached to a body 266 which is integrally formed with the casting of the housing 267. An intake port 268 is formed through the body 266 and the cylinder 265 to provide fluid from the reservoir thereof as shown by the level 250. In other words, it should be understood that the pump mechanism is completely immersed within the fluid contained within the pump section 201 of the operator. Spring means 269 is held between a spring retainer bushing 271 and a shoulder 271' formed between the cylinder 265 and the body 266 of the pump.

A check valve formed by a plunger 272 which is spring loaded by a spring 273 into engagement with a valve seat 274 functions to permit the fluid to pass from the cylinder 265 through the exhaust port 275 to the actuator as above described.

As also above pointed out, the pump may consist of two identical sections of the type above described if such is desired.

Figure 4:
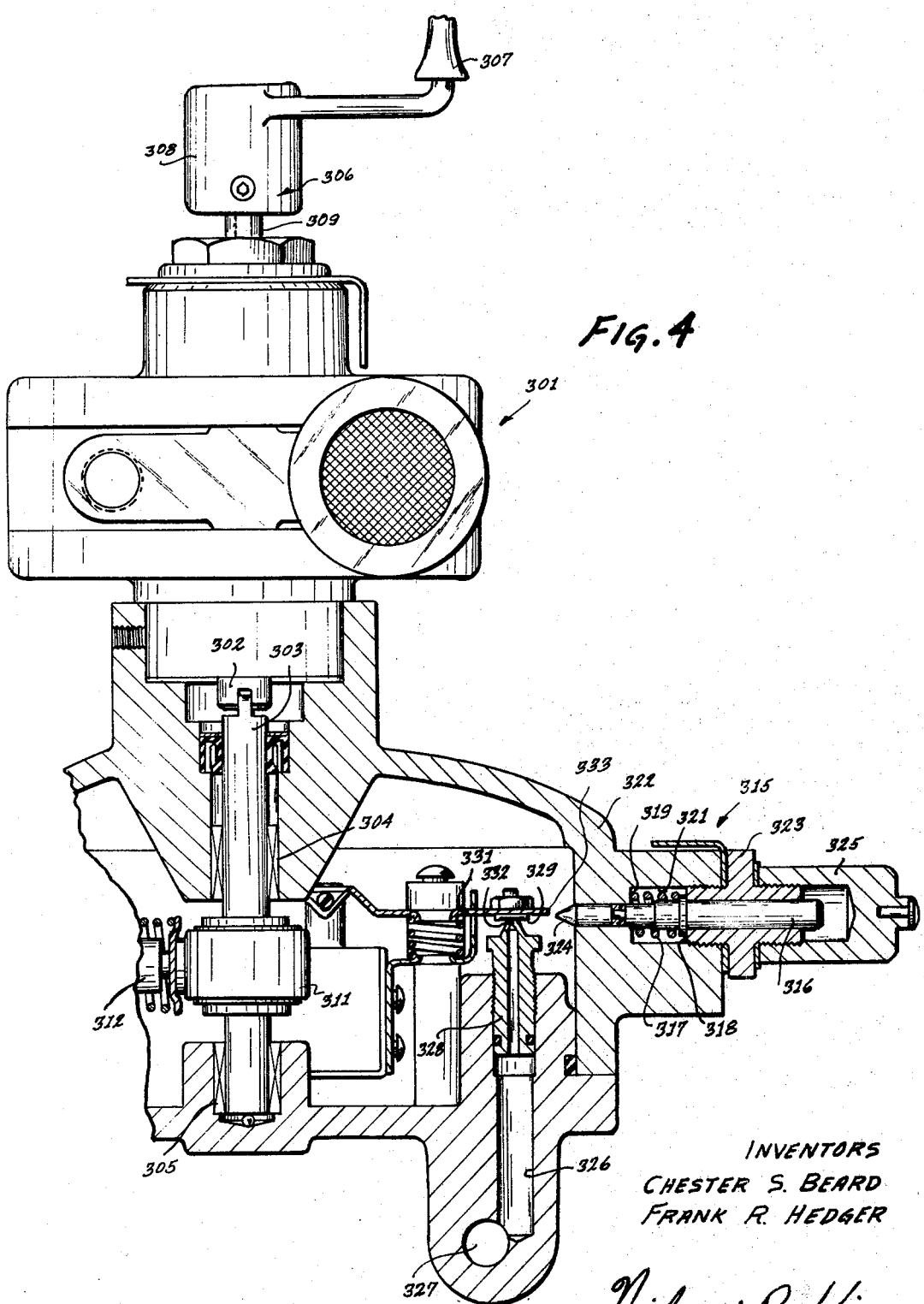
FIGURE 4 is a fragmentary view partly in cross-section illustrating an alternative embodiment of a valve operator constructed in accordance with the present invention.

Under some operating circumstances utilizing an operator of the type described herein, it is desirable to manually operate the opening and closing of the particular valve to which the operator is attached. Operating circumstances under which such may be desired is a malfunction of the prime mover or a loss of power normally utilized to energize the prime mover, or similar such circumstances. Apparatus constructed in accordance with the present invention having such manual operating characteristics is illustrated in FIGURE 4 to which reference is hereby made. As is clearly shown, FIGURE 4 is a fragmentary, partial cross-section view of a portion of the apparatus constructed in accordance with the present invention. As is illustrated in FIGURE 4, the prime mover constitutes a motor 301 which is driven by compressed gas such as air. Details of this apparatus are not illustrated since such is old and well known in the art. The drive shaft 302 of the motor 301 engages a driven shaft 303 which is mounted in bearings as schematically illustrated at 304 and 305 as well known in the art. A manual operating apparatus or means 306 in the form of a handle 307 affixed to and extending outwardly from a body section 308 and having a connecting rod 309 extending downwardly therefrom is shown inserted in operating position into the housing of the motor 301. The connecting rod 309 extends into driving connection through the air motor or other type prime mover so as to cause the shaft 302 to rotate as the handle 307 is rotated. Manual rotation of the shaft 302 in turn causes the driven shaft 303 to rotate and therewith the eccentric 311. Rotation of the eccentric causes the piston 312 of the pump (not shown in this view) to reciprocate, as above described in detail, thus pumping fluid through the conduits 50 and 60 to the actuator. As above pointed out, a relief valve must be actuated in one or the other of the conduits 50 or 60 to divert fluid from the actuator in order to permit the actuator to properly operate.

Manual manipulators for the relief valves are illustrated generally at 315 and as shown include a push rod 316 which is spring-loaded by means of a spring 317 seated against one side of the shoulder of a flange 318 on the rod 316 and against a shoulder 319 formed within a bore 321 provided within the wall of the housing 322. A retainer nut 323 maintains the push rod 316 in the position illustrated by abutting the other side of the shoulder of the flange 318 provided thereon. The push rod 316 terminates internally of the housing 322 in a beveled or chamfered point 324, the function of which will be described more fully hereafter. A protective cap member 325 is threadably received upon the nut 323 to preclude accidental manipulation of the push rod 316.

The body 322 defines a bore 326 which communicates with the passageway 327 leading to one of the chambers 209 or 210 (FIGURE 2). Seated within the bore 326 is an orifice defining means 328, and as herein illustrated, it may take the shape of a nozzle though such is not critical. A sealing cap 329 is provided upon an arm 331 so as to position the sealing cap 329 over the end 332 of the nozzle. Thus in its normally de-energized position, the sealing cap 329 is seated over the end 332 of the nozzle and thereby seals the same. As above pointed out, upon energization of the solenoid, the cap 329 is retracted from the end 332 of the nozzle to relieve the pressure in the conduit 327 while permitting pressure to build up in the alternate conduit to thereby actuate the actuator.

In the structure as illustrated in FIGURE 4, the bevel 324 on the push rod 316 operates as a cam surface and contacts the end 333 of the arm 331 which functions as a cam follower and manually raises the sealing cap 329 out of engagement with the end 332 of the nozzle, thereby manually relieving the passageway 327 so that as the driven shaft 303 is rotated by the handle 307, the piston 312 is reciprocated to pump fluid into the conduit alternate to the conduit 327 thereby to manually drive the actuator. Similar structure to that illustrated in FIGURE 4 is duplicated for the alternate side of the apparatus as illustrated schematically in FIGURE 1.

There has thus been disclosed in some detail a valve operator which is self-contained and which provides physical movement to open or close a given valve in response to the application of control signals thereto which fully utilizes the full available power from the pump, which locks the entire system in the last position in the event power is removed from the prime mover, which may be field adjusted to any desirable setting for pressure interruption of the application of power to the valve, which is simple, easy to maintain and rugged. The illustration and above description and the details provided are to be taken by way of example only as one embodiment of the present invention and in no way is intended to limit the scope of the invention as defined in the appended claims.

What is claimed is:

1. A valve operator comprising:
 (A) actuator means adapted for connection to a valve;
 (B) first and second pump means, each being adapted to simultaneously provide fluid under pressure;
 (C) first and second conduit means connected between said first and second pump means respectively and said actuator means to supply fluid under pressure to operate said actuator thereby to move said valve toward open and closed positions;
 (D) first and second valve means operatively connected with said first and second conduits respectively;
 (E) means for individually and alternately operating said first and second valve means to connect the fluid from one of said pump means to said actuator to move said valve while the fluid from the other of said pump means is diverted from said actuator; and
 (F) pressure actuated cutoff means connected to receive the pressure in one of said conduits and operative to shut off the supply of fluid under pressure to said actuator when the pressure in said one conduit exceeds a predetermined pressure, said predetermined pressure being determined by the force required to seal said valve in its closed position.

2. A valve operator as defined in claim 1 wherein said actuator means is a cylinder having a piston slidably positioned therein thereby to define first and second chambers, one on each side of said piston, said first and second conduits being connected to said first and second chambers respectively, a housing, a cavity defined by said housing, said cylinder being supported by said housing within said cavity and defining a fixed space between the outer periphery of said cylinder and said housing, said space defining reservoir means for fluid, electric motor means connected to operate said pump means and including electrical wiring therefor, said electrical wiring being routed through said space between said housing and said cylinder defining reservoir means.

3. A valve operator as defined in claim 1 wherein said cutoff means includes a switch means and a spool, said spool being reciprocally mounted within a bore, spring means urging said spool a predetermined first distance within said bore toward but not into engagement with said switch means, a conduit communicating said spool with said actuator thereby to provide fluid pressure from said actuator to said spool to move said spool a predetermined second distance into engagement with said switch means.

4. A valve operator comprising:
(A) actuator means adapted for connection to a valve;
(B) first and second pump means each being adapted to simultaneously provide fluid under pressure;
(C) first and second conduit means connected between said first and second pump means respectively and said actuator means to supply fluid under pressure to operate said actuator thereby to move said valve toward open and closed positions;
(D) an electrically operated relief valve operatively connected to each of said first and second conduits, the relief valve connected to said first conduit being open when fluid under pressure is provided to said second conduit and the relief valve connected to said second conduit being open when fluid under pressure is provided to said first conduit;
(E) first and second valve means operatively connected with said first and second conduits respectively;
(F) means for individually and alternately operating said first and second valve means to connect the fluid from one of said pump means to said actuator to move said valve while the fluid from the other of said pump means is diverted from said actuator.
(G) an electric motor connected to operate said pump means; and
(H) switch means connecting electrical energy simultaneously to said motor and to one only of said relief valves.

5. A valve operator comprising:
(A) actuator means adapted for connection to a valve;
(B) first and second pump means, each being adapted to simultaneously provide fluid under pressure;
(C) manually manipulatable apparatus for manually driving said first and second pump means to thereby provide said fluid under pressure;
(D) manually operated relief valve means connected to said first and second conduits for diverting fluid from one of said pump means when said first and second pump means is being manually driven;
(E) first and second conduit means connected between said first and second pump means respectively and said actuator means to supply fluid under pressure to operate said actuator thereby to move said valve toward open and closed positions;
(F) first and second valve means operatively connected with said first and second conduits respectively; and
(G) means for individually and alternately operating said first and second valve means to connect the fluid from one of said pump means to said actuator to move said valve while the fluid from the other of said pump means is diverted from said actuator.

6. A valve operator comprising:
(A) actuator means adapted for connection to a valve;
(B) a prime mover;
(C) first and second pump means, each being adapted to simultaneously provide fluid under pressure;
(D) a rotatable shaft connected between said prime mover and said first and second pump means;
(E) manually operably handle means connected to rotate said shaft;
(F) first and second conduit means connected between said first and second pump means respectively and said actuator means to supply fluid under pressure to operate said actuator thereby to move said valve toward open and closed positions;
(G) first and second valve means operatively connected with said first and second conduits respectively; and
(H) means including manually operable apparatus for individually and alternately operating said first and second valve means to connect the fluid from one of said pump means to said actuator to move said valve while the fluid from the other of said pump means is diverted from said actuator.

7. A valve operator as defined in claim 6 which includes a housing and wherein said first and second valve means are disposed internally of said housing and said manual apparatus is first and second push rods extending through said housing and adapted upon being depressed to extend into engagement with said first and second valve means, respectively, thereby to actuate said first and second valve means.

References Cited

UNITED STATES PATENTS

| | | | |
|---|---|---|---|
| 1,616,841 | 2/1927 | Beebe | 60—52 XR |
| 1,993,612 | 3/1935 | Lum | 60—52 XR |
| 2,352,390 | 6/1944 | Kirkland | 60—52 |
| 2,938,347 | 5/1960 | Sturgis | 60—51 XR |
| 2,942,581 | 6/1960 | Gaffney | 60—52 |
| 3,087,471 | 4/1963 | Ray | 60—52 XR |
| 3,201,939 | 8/1965 | Gut | 60—52 |
| 3,360,930 | 1/1968 | Haag | 60—52 |

EDGAR W. GEOGHEGAN, Primary Examiner

U.S. Cl. X.R.

91—3; 103—171